Oct. 13, 1964

L. J. J. COHAN ETAL 3,152,562

COMBUSTION INDUCER FOR REFUSE INCINERATOR
USING HORIZONTAL TRAVELING GRATE STOKER

Filed Dec. 27, 1962

INVENTOR.
LEO J.J. COHAN
DEAN YOUNG

BY

*Robert L. Olson*
ATTORNEY 3,152,562
COMBUSTION INDUCER FOR REFUSE INCINERATOR USING HORIZONTAL TRAVELING GRATE STOKER
Leo J. J. Cohan, Simsbury, Conn., and Dean Young, Larchmont, N.Y., assignors to Combustion Engineering, Inc., Windsor, Conn., a corporation of Delaware
Filed Dec. 27, 1962, Ser. No. 247,616
1 Claim. (Cl. 110—8)

This invention relates to an incinerator furnace utilizing a horizontal grate stoker, and in particular to an incinerator furnace for burning garbage or refuse.

Many municipalities today dispose of their refuse or garbage by burning it in an incinerator furnace which utilizes a traveling grate stoker. The major portion of the refuse in recent times consists of cellulosic material, for example in the form of paper or cardboard, and thus the bed of refuse traveling through the incinerator burns from the top of the refuse bed downwardly. In order to accomplish more rapid and complete burning of the refuse, a portion of the combustion air is introduced into the furnace from beneath the upper run of the traveling grate stoker. As this air passes up through the refuse bed, there is a more intimate contact between the cellulosic fuel and the air, which results in a more rapid and complete combustion thereof.

On occasion a number of large flat pieces of paper or cardboard are fed onto the endless traveling grate simultaneously, which will form a mat on the upper grate run. This matting of paper and/or cardboard will act as a damper, permitting little or no air to flow upwardly through the refuse bed, thus greatly reducing the burning rate thereof.

It is an object of our invention to provide an incinerator which will permit more rapid and complete combustion of refuse therein, regardless of the condition of such refuse.

Additional objects and advantages of the invention will appear from the following description of a preferred embodiment thereof when considered in conjunction with the accompanying drawings wherein.

Looking now to the drawings, numeral 10 denotes an incinerator furnace wherein refuse or garbage is burned or disposed of. The refuse or garbage is fed into the furnace by way of feed hopper 14, the bottom opening of which is positioned directly above the moving stoker grate 12. The falling refuse forms an evenly distributed bed upon the upper grate run 13 of the stoker. As the refuse is carried along into the furnace interior by the traveling endless stoker grate, combustion starts, with the bed burning from the top downwardly.

Figure 1:
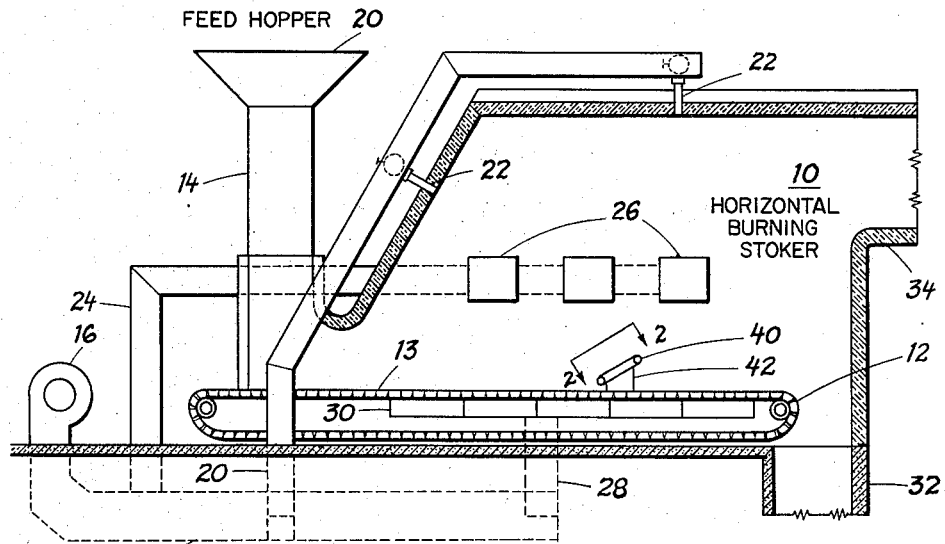
FIG. 1 is a sectional elevation of an incinerator furnace incorporating our invention.

Forced draft fan 16 supplies the air necessary to maintain combustion of the refuse within the incinerator. Main duct 18, one end of which is connected to the discharge of fan 16, conveys air to branch duct 20, which supplies air to inlet nozzles 22 positioned in the upper front portion and the top portion of the furnace. Air also enters the furnace through both side walls by way of branch duct 24, and inlets 26. Branch 28 conveys air to chamber 30, positioned beneath the upper run 13 of the traveling grate. The bars forming the grate are somewhat spaced, so as to allow air to flow upwardly therethrough. As illustrated in FIG. 1, chamber 30 extends longitudinally beneath the upper grate run throughout the major portion of its length.

The ashes and other residue left after complete combustion of the refuse is discharged from the incinerator by way of discharge opening 32. Numeral 34 designates the exhaust opening for the hot combustion gases created during the combustion of the fuel. Combustion inducer 40 is maintained directly above the upper grate run 13 by means of supports 42, which rest upon and are directly supported by such upper grate run.

Figure 2:
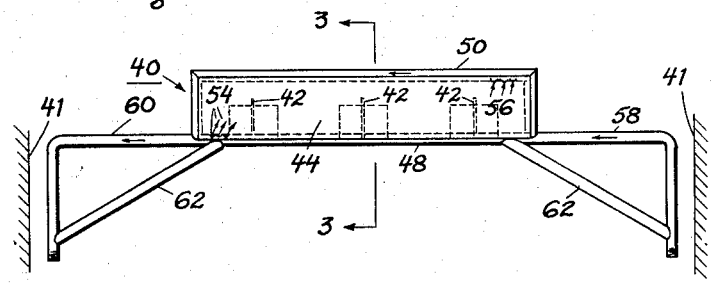
FIG. 2 is an enlarged view of the novel combustion inducer taken on line 2—2 of FIG. 1.
Figure 3:
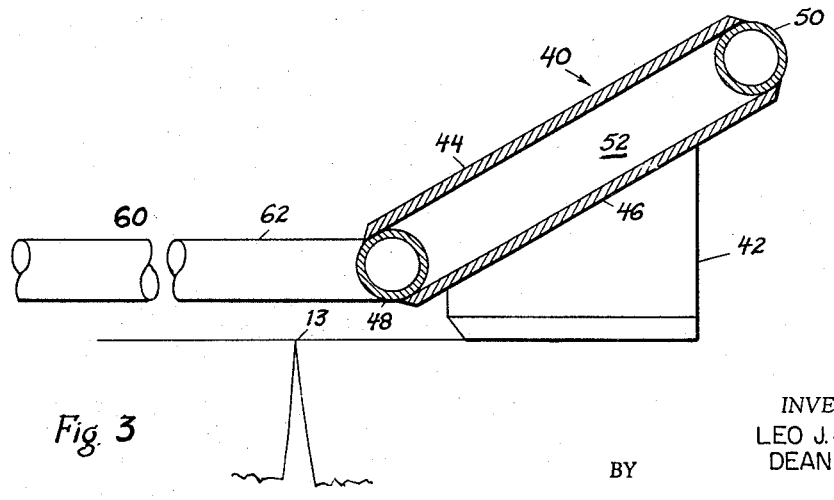
FIG. 3 is an enlarged sectional elevation taken on line 3—3 of FIG. 2.

Looking now to FIGS. 2 and 3, the details of combustion inducer 40 can be seen. As shown in FIG. 3, the combustion inducer consists of a member made up of upper plate 44, and lower plate 46, both of which are welded to lower nose pipe 48 and upper pipe 50. Side plates, not shown, are also welded to the edges of plates 44 and 46 so as to form a completely enclosed chamber 52. Cooling water is allowed to flow into the lower pipe 48 from inlet pipe 58. This incoming water then enters chamber 52 through openings 54, and exits from the chamber by way of openings 56 in upper pipe 50. The water then flows from pipe 50 through outlet pipe 60. Braces 62 are welded to the pipes so as to make the entire structure more rigid.

As best seen in FIG. 2, the inlet and outlet pipes 58 and 60 extend down along the incinerator walls 41 and pass out of the furnace through the front furnace wall. By making a portion of the inlet and outlet pipes flexible or adjustable, it is possible to make the combustion inducer adjustable in position. This enables the combustion inducer to be moved either forwardly or rearwardly along the traveling grate stoker.

As shown in FIG. 2, the combustion inducer is positioned centrally of the upper grate run, and only extends across approximately half of the grate width. The reason for this is that generally the refuse bed tends to be somewhat higher through the middle portion than it is on the side portions of the grate. Thus it is desirable to concentrate air flow and by elevating the bed increase the porosity so that the concentrated air flow can permeate this portion of the fuel bed, whereas it is generally not as necessary along the side portions of the bed. However, if it were found in some incinerators to be desirable to have the combustion inducer extend across the full width of the stoker grate, this could be readily done. The best location of the combustion inducer is a little rearwardly of the midpoint of the traveling grate stoker. In this location, the depth of the fuel bed has already been greatly reduced by the burning thereof from the top on downwardly and thus the bed is easily disrupted by the combustion inducer to allow air to flow therethrough.

The operation of the device will now be explained. Refuse is fed into the incinerator from feed hopper 20 through feed chute 14 onto the upper run 13 of traveling grate stoker 12. As this upper run 13 moves to the right as shown in FIG. 1, the refuse is ignited and starts to burn. In the event that a number of large flat pieces of paper or cardboard have been positioned directly above the upper grate run 13, combustion air will be substantially prevented from flowing through the grate bars from chamber 30. As this matting of cardboard and paper approaches the front nose 48 of the inclined combustion inducer 40 it is lifted off the upper grate run 13, and is pushed upwardly over the combustion inducer 40 by the refuse immediately behind it. The area directly beneath lower plate 46 of the combustion inducer and above the upper run 13 is an open space where air coming from chamber 30 is allowed to concentrate. As the fuel passes over the upper edge 50 of the combustion inducer, a shearing and loosening effect of the bed takes place, and the concentrated air located beneath the combustion inducer is allowed to flow into and through the fuel bed at this point. Thus there is rapid burning at this location. The air flowing up through the upper grate run 13 beneath the combustion inducer 40 has a high velocity flow directly adjacent lower plate 46, and it is believed that this high velocity flow directly adjacent this plate tends to cause eddies of hot combustion gases to swirl back under the combustion inducer, this also aiding in the rapid combustion adjacent pipe 50.

Upper pipe 50 should be positioned at a sufficient height above the upper run 13 so that the fuel bed is substantially disturbed as it passes thereover and falls back onto the upper grate run. A typical height of nose pipe 50 may be 6 to 12 inches above the upper grate run. If the rear edge of the combustion inducer is not positioned somewhat above the upper run, the fuel bed could pass over the combustion inducer without being disturbed at all, and thus the air would not be able to penetrate therethrough.

While the preferred embodiment of the invention has been shown and described, it will be understood that minor changes in construction may be made without departing from the spirit and scope of the invention as claimed.

What we claim is:

In an incinerator furnace for burning mixed refuse, the furnace comprising enclosing walls and a furnace bottom, a travelling grate stoker having an upper grate run having a plane which extends along the lower part of the furnace, a refuse feed chute by means of which incoming refuse is supplied to one end of the upper run, an ash disposal opening in the furnace bottom adjacent and below the other end of the upper grate run through which ash is allowed to discharge from the furnace, a furnace outlet means through which combustion gases pass, means for supplying combustion air to the furnace through the upper grate run, refuse deflecting means positioned directly above the upper grate run, said deflecting means including a pair of flat, spaced apart, parallel plates, means for securing the plates together around their entire peripheries, thus forming a completely enclosed chamber therebetween, said plates being positioned at an angle to the plane of the upper grate run so as to form a cavity between the upper grate run and the lower plate through which combustion air can flow to the furnace interior, the lower edge of the lower plate being closer to said one end of the upper grate run than the higher edge, means for positioning said plates such with respect to the upper grate run that the upper grate run passes beneath the lower plate while the refuse carried thereon passes over the upper plate, and inlet and outlet means connected to the chamber through which a cooling fluid can be introduced to and discharged from such chamber.

References Cited in the file of this patent

UNITED STATES PATENTS

| | | |
|---|---|---|
| 755,662 | Hill | Mar. 29, 1904 |
| 2,882,841 | Ferriss et al. | Apr. 21, 1959 |
| 3,064,593 | Burk et al. | Nov. 20, 1962 |

FOREIGN PATENTS

| | | |
|---|---|---|
| 358,172 | Great Britain | Oct. 3, 1931 |